United States Patent
Simon et al.

(10) Patent No.: US 10,503,667 B1
(45) Date of Patent: Dec. 10, 2019

(54) CHARGER GATEWAY PROVIDING TWO-WAY CHARGER GATEWAY PROVIDING TWO-WAY COMMUNICATIONS FOR ONE OF MORE OF THE FOLLOWING PRODUCT CATEGORIES: SECURITY DEVICES, LIFE SAFETY DEVICES, HOME AUTOMATION DEVICES, PERSONAL EMERGENCY RESPONSE (PERS) DEVICES AND TELE-HEALTH DEVICES

(71) Applicants: Scott Simon, Huntington Station, NY (US); Matthew Schweiger, Huntington Station, NY (US)

(72) Inventors: Scott Simon, Huntington Station, NY (US); Matthew Schweiger, Huntington Station, NY (US)

( * ) Notice: Subject to any disclaimer, the term of this patent is extended or adjusted under 35 U.S.C. 154(b) by 0 days.

(21) Appl. No.: 15/922,430

(22) Filed: Mar. 15, 2018

(51) Int. Cl.
| G06F 13/10 | (2006.01) |
| H02J 7/00 | (2006.01) |
| H04L 12/28 | (2006.01) |
| H04L 12/66 | (2006.01) |

(52) U.S. Cl.
CPC ............ *G06F 13/10* (2013.01); *H02J 7/0042* (2013.01); *H02J 7/0047* (2013.01); *H04L 12/2834* (2013.01); *H04L 12/66* (2013.01); *G05B 2219/2642* (2013.01)

(58) Field of Classification Search
CPC .......... G06F 21/32; G06G 21/34; H04L 63/02
USPC .......................................................... 710/8
See application file for complete search history.

(56) References Cited

U.S. PATENT DOCUMENTS

| 2006/0075235 | A1* | 4/2006 | Renkis | G08B 13/19621 |
| | | | | 713/171 |
| 2013/0165048 | A1* | 6/2013 | Karlsson | H04M 1/05 |
| | | | | 455/41.3 |
| 2015/0135310 | A1* | 5/2015 | Lee | A61B 5/681 |
| | | | | 726/20 |
| 2015/0162994 | A1* | 6/2015 | Rodzevski | H04W 76/14 |
| | | | | 455/39 |
| 2015/0334087 | A1* | 11/2015 | Dawes | H04L 63/02 |
| | | | | 726/12 |
| 2016/0141744 | A1* | 5/2016 | Smith | H01Q 1/1257 |
| | | | | 342/359 |

* cited by examiner

*Primary Examiner* — Getente A Yimer
(74) *Attorney, Agent, or Firm* — Carter, DeLuca & Farrell LLP

(57) ABSTRACT

A charger base station includes at least one of a security system, home automation system, life safety system, a PER system and a tele-health system, the charger base station including a housing having a charger port for charging an electronic device with the housing having a compartment for a microprocessor, a memory, a firmware, a transceiver, a cellular communicator, Wi-Fi, and hardware, and software producing a security system supporting IP video, at least one peripheral device taken from the group of 319 MHz, 345 MHz, 433 MHz, 868 MHz and 900 MHz wireless peripherals, a home automation system serving as controller of z-wave or zigbee devices, life safety devices, a PERs device and tele-health device capable of measuring, recording and wirelessly transmitting physiological data of a connected tele-health product, life safety device and a PERs via at least one of a backend device, a central station device and local and remote user devices.

13 Claims, 5 Drawing Sheets

CHART OF THE CHARGER FEATURES.

10

CHARGER BASE STATION INCORPORATING ONR OR MORE OF THE FOLLOWING: SECURITY, HOME AUTOMATION, LIFE SAFETY, TRADITIONAL PERs AND TELEHEALTH FEATURES.

- CELLULAR COMMUNICATOR AND/OR WI-FI IN CHARGER AND/OR SIGFOX AND/OR LORA;

- TRANSMIT ZONE STATUS AND TEXT ALERTS OR NOTIFICATIONS TO BACKEND/ CENTRAL STATION AND/OR END-USER;

- PERSONAL EMERGENCY RESPONSE (PERS) AND WIRELESS PANIC BUTTONS;

- SMART HOME FEATURES INCLUDE ZWAVE AND/OR ZIGBEE FOR CREATING A MESH NETWORK OF CHARGER ZONE HOME AUTOMATED DEVICES TO CONTROL AND RECEIVE INFORMATION ABOUT HOME AUTOMATION ;

- SECURITY FEATURES INCLUDES IP VIDEO/WIFI, 319 MHZ/ 345MHZ/ 433MHZ/ 868MHZ/ 900 MHZ WIRELESS PERIPHERALS, SMOKE CARBON, FLOOD DETECTION;

- BLUETOOTH FOR COLLECTING AND TRANSMITTING TELEHEALTH INFORMATION; POSITIONING AND TRACKING OF PEOPLE AND WEARABLES

- ALL ALERTS AND NOTIFICATIONS; AND

- OPTIONAL BACKUP BATTERY.

FIG. 5

CHARGER GATEWAY PROVIDING TWO-WAY CHARGER GATEWAY PROVIDING TWO-WAY COMMUNICATIONS FOR ONE OF MORE OF THE FOLLOWING PRODUCT CATEGORIES: SECURITY DEVICES, LIFE SAFETY DEVICES, HOME AUTOMATION DEVICES, PERSONAL EMERGENCY RESPONSE (PERS) DEVICES AND TELE-HEALTH DEVICES

BACKGROUND OF THE INVENTION

The present invention relates, generally, to the ubiquitous electronic device charger and, more specifically, to a charger base station, providing global two-way communication with and functional control of devices in the fields of security, home automation, life safety, PERs and telehealth.

Also provided for the aforementioned security, home automation, life safety, PERs and tele-health systems are user application interfaces providing wireless touch screen status and control for all connected devices locally and remotely.

SUMMARY OF THE INVENTION

Currently the charger is unused "real estate" with only one function; to charge something i.e. mobile personal emergency response device (mPERs).

A primary object of the present invention is therefore to create a charger incorporating hardware and software for one or more of the following: security, home automation, life safety, traditional PERs and telehealth systems having one or more system respective peripheral device(s) in two-way communication with, keypad controller, tablets, mobile phones, web browsers or other user interfaces for obtaining the status of and/or functional control of all peripheral systems devices including evoking wireless notification of component device state change both locally and remotely.

The charger base unit is capable of reporting information through multiple communication channels using cellular (data, voice, VOLTE, SMS), hereinafter inclusively referred to as cellular, Wi-Fi via customer internet connection, Sigfox or LoRa to several end points, this includes a backend which is capable of directing the information to a central station and/or end user device both locally and remotely (i.e., cell phone, tablet, PC, APP, etc).

Further the base unit may report directly to a central station with no backend, the charger, the backend and central station can report information to end users devices as stated above directly. Lastly the charger base unit is capable of making a call, via the cellular communicator or other methods either to the backend, central station and/or directly to end user.

The backend (portal) is a programmable communication switchboard that can be programmed to receive and send information to the charger unit. Further, the backend is capable of taking the information provided to it by the charger base station and delivering it to the appropriate end point. The backend can also provide information based on a request from a user, dealer, and central station with the proper access credentials as to the current state of the charger base station.

The charger base station provides several different communication technologies local to the base station ecosystem, such as security, wireless technologies such as but not limited to 319 MHz, 345 MHz, 433 MHz, 868 MHz, 900 MHz, IP Video (wired or wireless); zigbee and/or z-wave for home automation; and Bluetooth for telehealth devices.

While the paragraph above describes these elements as being local to the charger base station ecosystem their current state can be viewed and or changed by the "external world" meaning end points that have the proper access credentials to do so.

The method that data flows to and from the charger base station to the "external world" is completely programmable in the charger base station and backend end user apps and other devices that connect wirelessly to the backend or charger base station. The charger base station can communicate with the "external world" via cellular, Wi-Fi using the end-user's ISP connection, optional Sigfox and/or optional LoRa. The priority and method used to communicate information to and from the charger base station through the backend is completely configurable.

For example, one such configuration would be to send the data by Wi-Fi. However, if for some reason that method fails the charger base station will roll its communication path to cellular. If the cellular fails then the charger base station will use either Sigfox or LoRa if available.

Currently if two-way voice is required the cellular voice channel or VOLTE or Wi-Fi voice will be used.

The above is just one example of how the charger base station can be configured to communicate with the "external world". Depending on the application, the charger base station can be configured to send data and voice, over any path, in any order based on how the charger base station is programmed.

The backend interfaces with the end user by allowing notifications to go to the appropriate end user based on the information received. The backend also allows the end user to control the state of the security system as well as receive notifications of the state of the security and various life safe devices.

The back end provides the end user with the ability to view and change the state of the home automation devices. The backend will also receive any data communicated to the charger base unit for the purposes of telehealth. Just for clarity, end user may be either or both the people the unit is for as well as caregivers, i.e. family, friends, neighbors, etc.

The security system includes IP video, wireless technologies such as but not limited to 319 MHz, 345 MHz, 433 MHz, 868 MHz, 900 MHz wireless peripheral(s), such as, panic button(s), door(s) and window contact(s), motion detector (s), glass breakage detector (s), smoke detector (s), CO detector (s), water/flood detector (s), with each device capable of providing information via the previously defined communication channels.

The home automation system serves as a hub controller for Zigbee and/or Z-wave peripheral devices including, lighting, environmental controls, thermostats, appliances, garage controllers and locks capable of providing information via the previously defined communication channel.

Additionally, the charger base station may incorporate Bluetooth® (a registered trademark of Bluetooth SIG, Inc., a Delaware corporation, having its principal place of business at 5209 Lake Washington Boulevard, Suite 350, Kirkland, Wash. 98033) telecommunications equipment that can be used in conjunction with the local remote keypad, tablet and/or app, providing but not limited to the positioning and tracking of people, measuring, recording and wirelessly transmitting physiological data of connected health care products, such as, user wearable biosensor(s), blood glucose monitors, pulse oximeters, heart rate monitors, scales and inhalers via the previously defined communication channels.

Additionally as an option, the charger base station may incorporate Sigfox or LoRa RF devices that can be used in conjunction with the local remote keypad, tablet and/or app, providing measuring, recording and wirelessly transmitting data of home appliances, wearable devices, smoke and fire detection, door, window and motion sensors, tracking of people and property, fall detection, flood detection, temperature and gas detection via the previously defined communication channels.

It is thus desirable to provide a charger base station incorporating one or more of the following: security, home automation, life safety, PERs and telehealth systems.

It is further desirable to provide application user interfaces for keypad, touch screen, tablet, cell phone providing two-way communication with and functional status and control of all connected devices within one or more of the following: security, home automation, life safety, PERs and telehealth systems both locally and remotely.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
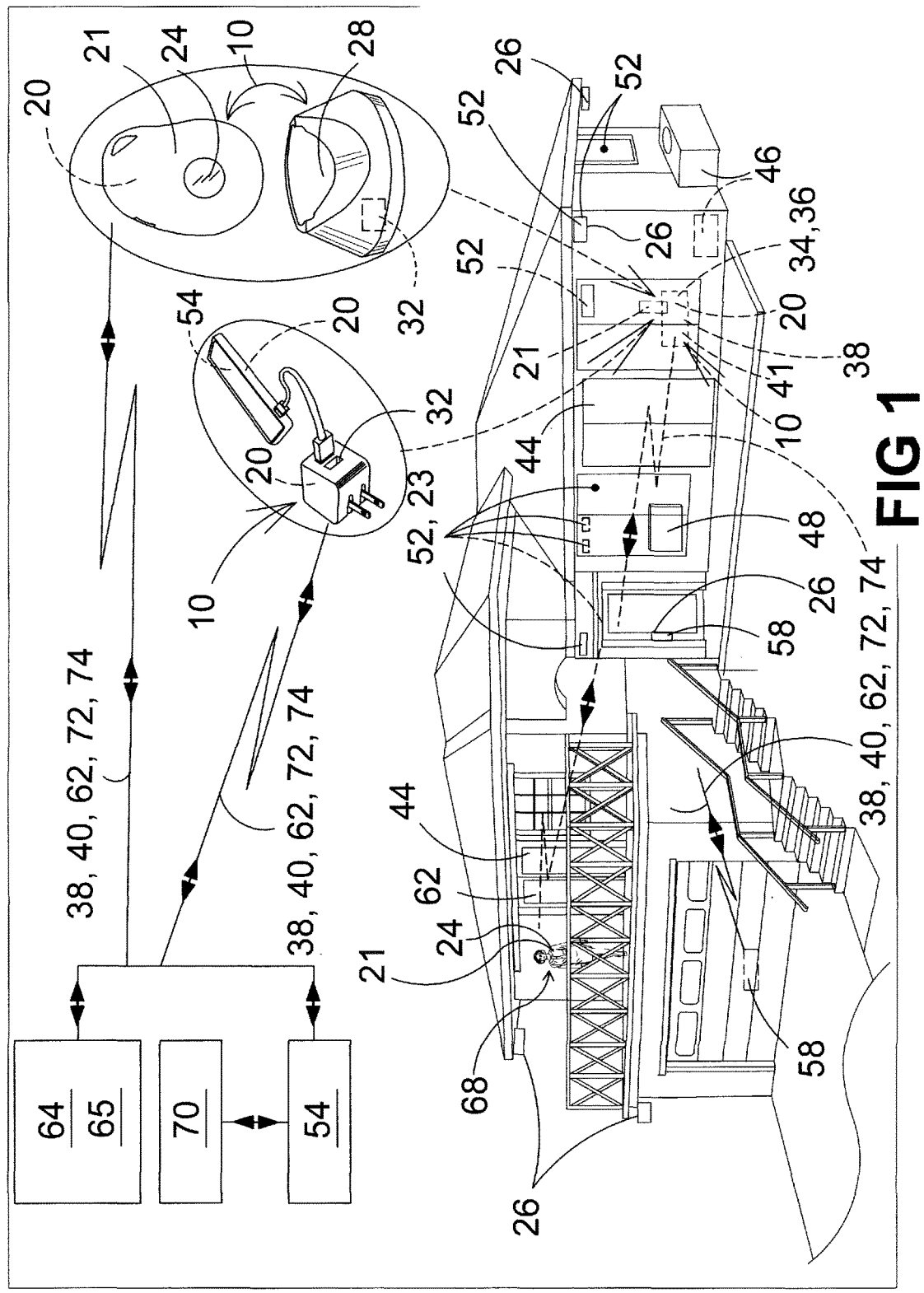
FIG. 1 is an illustrative view of the present invention in use.

Turning now descriptively to the drawings, in which similar reference characters denote similar elements throughout the several views, the figures illustrate the use of the present invention. With regard to the reference numerals used, the following numbering is used throughout the various drawing figures.

10 charger incorporating one or more of the following: security, home automation, life safety, traditional PERs and telehealth systems
12 power source
14 switch
16 processor
18 memory
20 cellular communicator (data, voice, VOLTE, SMS) one of the following 2 g, 3 g, 4 g, LTE or any later cellular network systems
21 mobile personal emergency response (mPERs) cellular radio
22 personal emergency response (PERs)
23 life safety devices (i.e.: fire, smoke, carbon monoxide)
24 panic button-life safety actuator
26 IP video/audio/microphone/speaker/camera over Wi-Fi in the charger
28 charging port
30 optional backup battery
32 optional external device port
34 zigbee chip
36 z-wave chip
38 Wi-Fi
40 Bluetooth™ telehealth and/or positioning and tracking
41 siren (optional)
42 transceiver
44 lighting
46 environmental controls
48 appliances
52 security peripherals including door/window contacts, motion sensors, glass break detectors and flood and temperature hi/low sensors
54 app-cell phone/tablet/web enabled device/keypad/charger base station
58 locks and/or garage controllers
62 319 MHz, 345 MHz, 433 MHz, 868 MHz, 900 MHz, Wi-Fi, Bluetooth®, cellular, wireless transmissions
64 central monitoring station
65 two-way voice connection
66 visual/audible system state indicators
68 wearable devices and biosensor(s), blood glucose monitors, pulse oximeters, heart rate monitors, scales and inhalers, positioning and tracking devices
70 backend app (i.e.: cloud, portal)
72 Sigfox
74 LoRa

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

Referring to FIG. 1, shown is an illustrative view of the present invention in use. The charger base station 10 incorporating cellular communicator 20 provides one or more of the following: security, home automation, life safety, PERs and tele-health systems wired or wirelessly measuring, recording and transmitting data for security devices 52, home automation devices, including lighting 44, environmental control 46, appliances 48 and locks and/or garage controllers 58 through z-wave 36 and/or zigbee 34. IP Video 26 as well as Wi-Fi 38 access point to property owners ISP. The tele-health system using Bluetooth 40 provides app interface to connected wireless products including wearable biosensor(s), blood glucose monitors, pulse oximeters, heart rate monitors, scales and inhalers and positioning and tracking devices 68. The charger 10 further provides wireless communication 62 with the backend 70 and two-way voice communication 65 with the central monitoring station 64 and/or user app 54 for life safety devices including smoke, fire and carbon monoxide detectors, panic buttons 24, security devices 52, including door/window contacts, motion sensors, glass breakage sensors smoke detector, CO detector and/or actuating home automation 34, 36 devices—opening and closing entryway 58 for package delivery, utility services, etc in conjunction with IP video 26 monitoring activity and optional siren 41.

Also shown are a pair of embodiments with one providing charging port 28 for device i.e. mobile personal emergency response devices (mPERs) 21 or other devices with both providing an optional I/O port 32 with each charger base station 10 housing compartment for hardware and software creating charger base station security system, life safety, home automation system and telehealth system. Additionally shown is a backend 70 and/or central monitoring station 64 and user mobile device app 54 in communication with charger base station 10 serving as hub for charger peripheral telehealth articles 40, security and life safety peripherals 23, 24. 52 and home automation 34, 36 peripherals 44, 46, 48, 58 via the previously defined communication channels.

Figure 2:
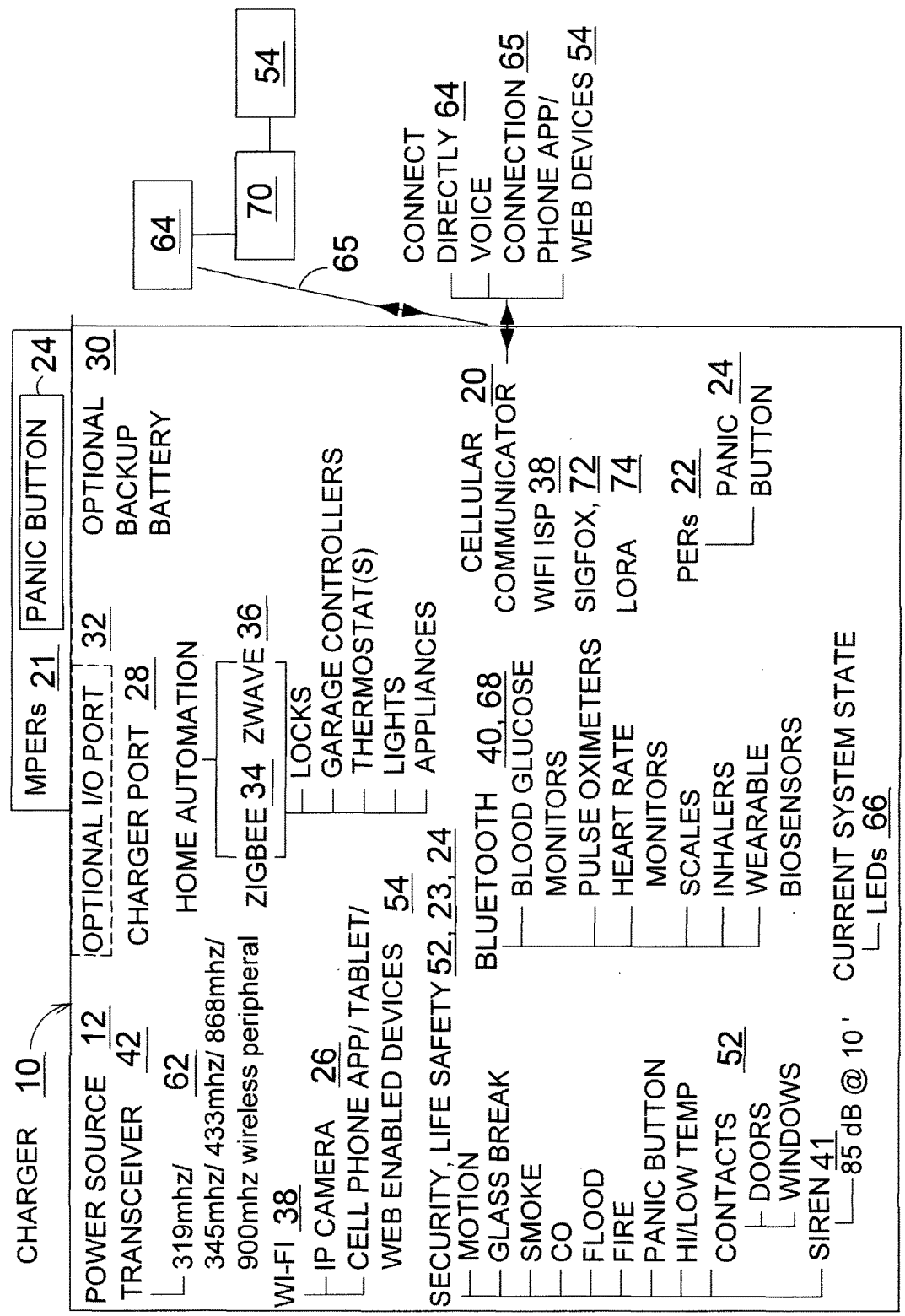
FIG. 2 is diagrammatic view of the charger's security, home automation and tele-health features including, mPERs, and personal emergency response (PERs)

Referring to FIG. 2, shown is a diagrammatic view of the charger base station of the present invention. As stated earlier, the ubiquitous charger has unused real estate. The instant invention envisions the charger base station 10 as a hub providing one or more of the following: security, home automation, life safety, PERs and telehealth systems in a charger housing providing wireless access to control, detect, monitor, change and respond to state changes providing information to the backend 70, central monitoring station 64 and end-user apps 54. Telehealth functions transmit physiological data wirelessly from a user's wearable bio-sensor(s), blood glucose monitors, pulse oximeters, heart rate monitors, scales and inhalers through the charger base station 10 to previously defined communication channels. Further provided are panic buttons 24 providing cellular two-way voice communication 65 through the previously defined communication channels.

Charger base station 10 home automation functions includes z-wave 36 and/or zigbee 34 home automation software enabling installing, controlling, monitoring, recording and reporting the status and/or state changes of home automation articles including but not limited to locks 58, garage controllers 58, thermostats 46, lights 44, appliances 48 and environmental controls 46.

Charger base station 10 security function comprises detecting, monitoring, recording and responding to state changes in security devices 52 including but not limited to contact sensors on doors and windows, motion detectors, glass breakage, fire, smoke, carbon monoxide, water/flood/temp, 319 MHz, 345 MHz, 433 MHz, 868 MHz and 900 MHz wireless peripherals 62 with the responding to state change includes cameras 26 providing IP video 62 through charger base station 10 using previously defined communication channels and optional siren 41 generating 85 dB @ 10 feet.

The charger base station 10 further provides charger port for charging electronic device i.e. mobile personal emergency response devices (mPERs) 21 having panic button 24 establishing communication through the previously defined communication channels with a central monitoring station operator and/or end-user. Also provides for an option to have battery backup 30 providing twenty-four hour backup; optional LEDs 66 as indicators for current system status and optional IO port 32 for connecting peripheral devices.

Figure 3:
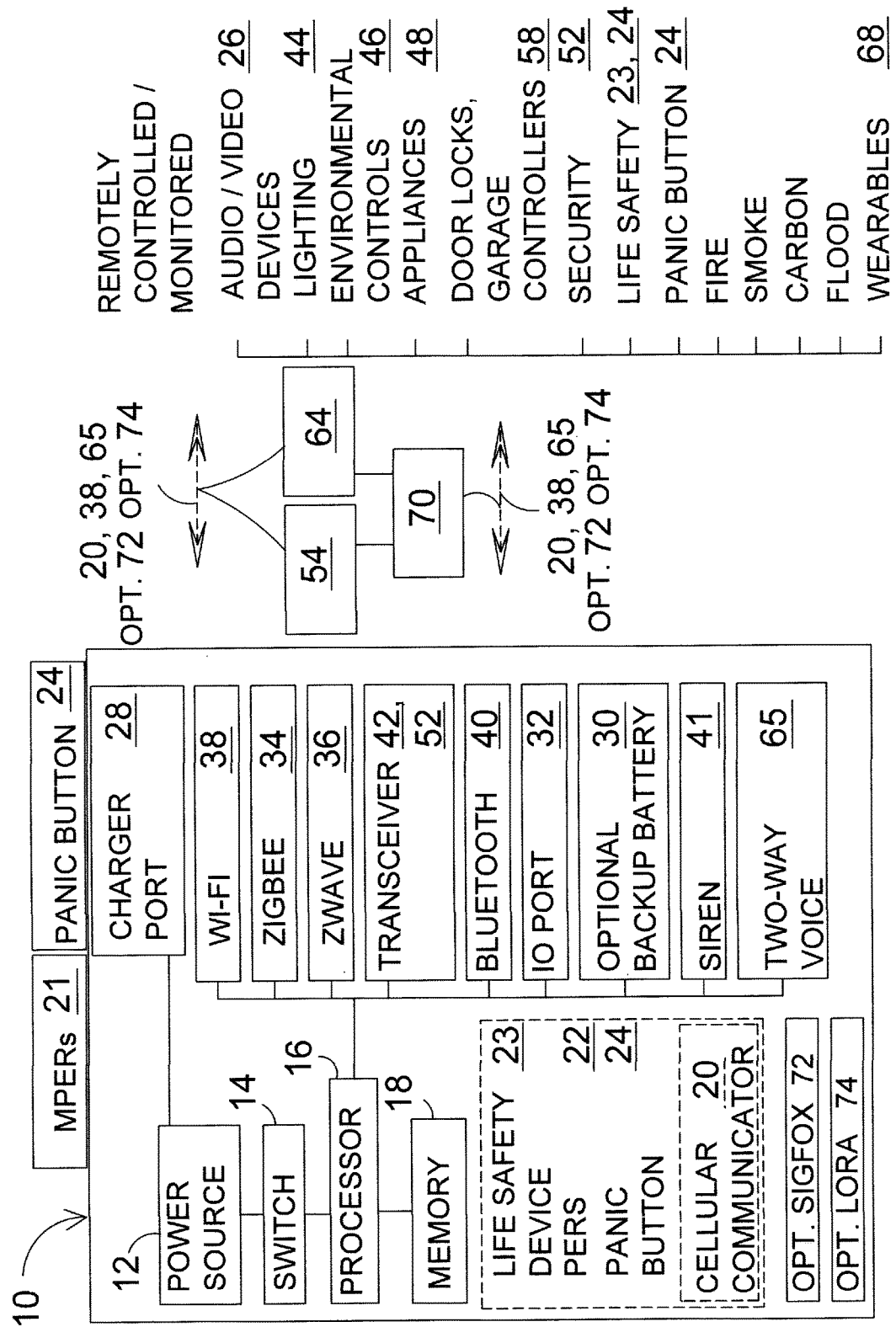
FIG. 3 is schematic chart of the charger of the present invention.

Referring to FIG. 3, shown is a schematic chart of the charger of the present invention incorporating one or more of the following: security, home automation, life safety, PERs and tele-health systems. The charger 10 comprised of power supply 12, powering charging port 28 and switch 14, processor 16 and memory 18, home automation protocols zigbee 34 and/or z-wave 36 along with Wi-Fi 38 and Bluetooth™ 40 and Security 52 and IP video 26. The charger 10 as well as charging mobile devices (i.e., mPERs), incorporates security and home automation 34, 36, personal emergency response (PERs) 22, as well as, users can locally and/or remotely operate 54 home automation products including cameras 26, lights 44, locks 58, garage controllers 58, appliances 48, and heating and cooling units 46, security wireless peripherals 52 and life safety devices 23/24. Additionally, all the methods above can be self monitored and/or monitored by previously defined communication channels.

Figure 4:
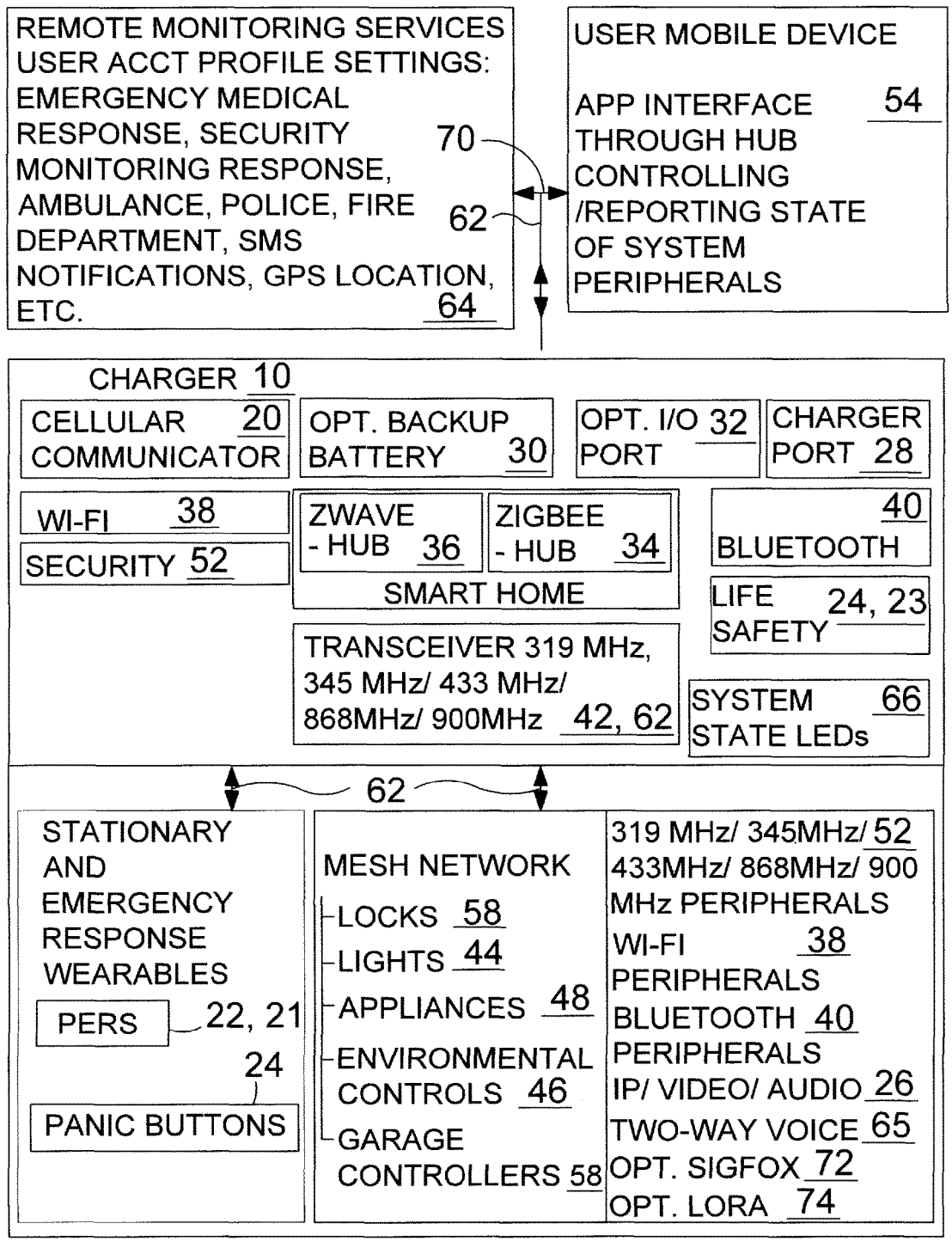
FIG. 4 is an illustrative chart of the charger features of the present invention; and, FIG. 5 is a chart of the charger features.

Referring to FIG. 4, shown is an illustrative chart of the charger features of the present invention. The charger 10 having charging port 28 will provide cellular communicator 20, Wi-Fi 38, optional sigfox 72 and optional LoRa 74, Bluetooth™ platforms 40 along with home automation protocols zigbee 34 and/or zwave 36 controlling home automation devices and security devices 52, in addition to life safety devices 23/24. The charger provides for device charging a multitude of devices not limited to but including mobile personal emergency response devices (mPERs), cell phones and other electronic devices.

Referring to FIG. 5, shown is a chart of the charger features. The charger base station incorporating one or more of the following: security, home automation, life safety, PERs and telehealth along with a cellular communicator, and/or Wi-Fi communicator, optional sigfox or optional LoRa. Events, notifications and/or alerts are transmitted through previously defined communication channels.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A charger base station incorporating at least one from the group of a security system, a home automation system, a life safety system, a personal emergency response system and a tele-health system, comprising:

a housing having a charger port for charging an electronic device, said housing having a compartment for a microprocessor, a memory, a firmware, a transceiver, a cellular communicator, Wi-Fi, and hardware and software providing a security system supporting IP video;

at least one peripheral device taken from the group of: 319 MHz, 345 MHz, 433 MHz, 868 MHz and 900 MHz wireless peripherals, a home automation system serving as controller of z-wave or zigbee devices, life safety devices, a personal emergency response device, and an apparatus for monitoring and assessing a person's health via measuring, recording and wirelessly transmitting physiological data of a connected tele-health product, life safety device and a personal emergency response device via at least one from the group of a backend device, a central station device and local and remote user devices; and applications downloadable to the person's electronic device for providing local and remote two-way communication through the charger base station with at least one from the group of a security system, a home automation system, a life safety system, a personal emergency response system, and said apparatus for monitoring and assessing the person's health, for determining status and functional control for all connected devices, wherein at least one from the group of the security system and the life safety system supports IP video and said at least one peripheral device.

2. The charger base station according to claim 1, further comprising an I/O port for wired and wireless communication with local and external devices.

3. The charger base station according to claim 1, further comprising Sigfox and LoRa communication protocols.

4. The charger base station according to claim 1, further comprising software application interface enabling two-way communication with at least one from the group of the backend device, the central station device and the local or remote end user device charger base station system.

5. The charger base station according to claim 1, further comprising an input/output capability to an electronic device for navigating menus, selecting and setting a system's peripheral components both locally and remotely.

6. The charger base station according to claim 5, wherein said housing further comprises an electronic display including at least one from the group of a touch screen display, a cellphone and a tablet and a keypad for navigating the charger base unit and subordinate peripherals both locally and remotely.

7. The charger base station according to claim 5, wherein said housing further comprises at least one audible and visual operational indicator.

8. The charger base station according to claim 1, wherein state changes of the security system establishes wireless communication through said charger base station via a communication channel with a backend, a central monitoring station, an app and local or remote user interfaces, detecting, monitoring and responding to a security device state change.

9. The charger base station according to claim 8, wherein said wireless communication includes at least one from the group of a cellular communication and a Wi-Fi transmission.

10. The charger base station according to claim 8, wherein said wireless communication includes at least one from the group of Sigfox wireless technology and LoRa wireless technology.

11. The charger base station according to claim 9, further comprising two-way voice communication between the central monitoring station and an end user app.

12. The charger base station according to claim 1, wherein the home automation system serves as hub controller for zigbee and/or z-wave peripheral devices including lighting, environmental controls, thermostats, appliances, garage controllers and locks providing information upon device state change.

13. The charger base station of claim 1, wherein said apparatus for monitoring and assessing the person's health includes a telecommunication device able to be used in conjunction with multiple user application interfaces providing measuring, recording and wirelessly transmitting physiological data of connected health care products via a wireless peripheral transmitting at a frequency of 319 MHz, 345 MHz, 433 MHz, 868 MHz or 900 MHz for performing user related health care tasks via said communication channels.

* * * * *